United States Patent [19]

Kim

[11] Patent Number: 5,629,932
[45] Date of Patent: May 13, 1997

[54] 12×12 STS-1 SWITCH

[75] Inventor: Dong-Wook Kim, Kyeongki-do, Rep. of Korea

[73] Assignee: Goldstar Information Communications, Ltd., Seoul, Rep. of Korea

[21] Appl. No.: 355,211

[22] Filed: Dec. 9, 1994

[30] Foreign Application Priority Data

Dec. 9, 1993 [KR] Rep. of Korea ............... 1993-27100

[51] Int. Cl.⁶ .................. H04J 3/02; H04Q 11/04
[52] U.S. Cl. .................................. 370/382
[58] Field of Search ................... 370/53, 55, 58.1, 370/58.2, 59, 63, 64, 66, 68, 68.1, 84, 110.1, 112, 99, 100.1, 102; 340/825.79, 825.8

[56] References Cited

U.S. PATENT DOCUMENTS

| | | | |
|---|---|---|---|
| 4,320,501 | 3/1982 | Le Dieu et al. | 370/64 |
| 4,450,557 | 5/1984 | Munter | 370/64 |
| 4,470,139 | 9/1984 | Munter | 370/66 |
| 5,311,506 | 5/1994 | Beisel | 370/58.1 |

*Primary Examiner*—Alpus H. Hsu
*Attorney, Agent, or Firm*—Keck, Mahin & Cate

[57] ABSTRACT

A 12×12 STS-1 switch for outputting twelve STS-1 signals by switching of a VT unit or tie STS-1 unit after receiving inputted twelve STS-1 signals includes a 4-coding counter generating a data control signal and a carry out signal after counting inputed signals in accordance with an operation frequency, a 90-coding counter generating a VT group and a VT channel after counting a frame pulse in accordance with the carry out signal generated at the 4-coding counter, an address generation part generating a switch information read address and a data selection address in accordance with the VT group and the VT channel generated at the 90-coding counter, a data selection signaling generation part outputting a data selection address generated at the address generation part in accordance with the selection signals outputed from the 4-coding counter after combining or selecting, and a data output part selecting and outputting an output data of a data memory in accordance with the data selection address outputted from the data selection signal generation part.

4 Claims, 3 Drawing Sheets

| VT GROUP | 0 | 1 | 2 | 3 | 4 | 5 | 6 | 7 | 8 | 9 | 10 | 11 |

VT1.5
| 0 | 1 | 2 | 3 | 0 | 1 | 2 | 3 | 0 | 1 | 2 | | VT CHANNEL
| 0 | 0 | 0 | 0 | 1 | 1 | 1 | 1 | 2 | 2 | 2 | 2 | VT PHASE

VT2
| 0 | 1 | 2 | 0 | 1 | 2 | 0 | 1 | 2 | 0 | 1 | 2 | VT CHANNEL
| 0 | 0 | 0 | 1 | 1 | 1 | 2 | 2 | 2 | 3 | 3 | 3 | VT PHASE

VT3
| 0 | 1 | 0 | 1 | 0 | 1 | 0 | 1 | 0 | 1 | 0 | 1 | VT CHANNEL
| 0 | 0 | 1 | 1 | 2 | 2 | 3 | 3 | 4 | 4 | 5 | 5 | VT PHASE

VT6
| 0 | 0 | 0 | 0 | 0 | 0 | 0 | 0 | 0 | 0 | 0 | 0 | VT CHANNEL
| 0 | 1 | 2 | 3 | 4 | 5 | 6 | 7 | 8 | 9 | 10 | 11 | VT PHASE

12×12 STS-1 SWITCH

FIELD OF THE INVENTION

This invention relates to a 12×12 STS-1 switch, and more particularly, to a 12×12 STS-1 switch for enabling the switching of a VT unit in the hub structure or the digital switching system of a 155 Mbps synchronous transmission equipment.

BACKGROUND OF THE INVENTION

Generally, the 12×12 STS-1 switch, as illustrated in FIG. 1. includes a data memory part 10 storing the inputted STS-1 data, a 90-coding counter 11 generating the write address of the data memory part 10 and the read address of a switch information memory part 12 by performing the count in accordance with the inputted frame pulse, the switch information memory part 12 where the switch information is stored, and data selection part 13 selecting and outputting the data outputted from the data memory part 10.

More specifically, the 90-coding counter 11 generates the write address of the inputted data by counting the inputted frame pulse from 1 to 90, inputs the generated write address into the data memory part 10, and generates and inputs the read address for the reading of the stored switch information data into the switch information memory part 12. The data memory part 10 records the inputted STS-1 data (1–N) according to the above input write address sequentially. That is, the first row of the input data is recorded in address 1 and the second row is recorded in address 2.

The STS-1 data input is made up of 90 rows×9 columns and the capacity of data memory part 10 becomes 90 bytes.

In addition, the data memory part 10 is comprised of 1 writing terminal (WADDR) and 11 reading terminal (RADA) s~o that the switching between channels is enabled. Therefore, in case of the 12×12 STS-1 switch which has twelve RADAS, the read address is inputted from the respective switch information memory part 12.

On the other hand, in case of the 12×12 STS-1 switch, the above switch information memory part 12 has 90 units for each STS-1 channel, making 11 bits one unit, and for each unit, 11~8 bits represent the STS-1 channel information and 7~0.1 bits represent the row information.

Among the switch information output from the above switch information memory part 12, 1~7 bits are inputted into the read address of the above data memory part 10 and 8~11 bits are inputted into the control signal of the data selection part 13.

Accordingly, the data selection part 12 receiving the control signal of 8~11 bits outputted from the above switch information memory part 12 selects and outputs one of N data outputted from the data memory part 10.

Since $N^2$ data outputted from the data memory part 10 must be connected to the N2 inputs of the n:1 data selection part 15, it is very difficult to manufacture the memory with several RADAs practically.

The attached FIG. 2 shows the configuration of a 12×12 STS-1 switch to solve the above problems by equipping the N-coding counter 14 and the N:1 data selector 15 additionally.

The N-coding counter 14 has an operation speed of N times the 90-coding counter 11, and 90-coding counter 11 counts in accordance with the carrying out of the N-coding counter 14.

Besides, the N:1 data selector 15 is used to select one of the switch informations of the address assigned by the above 90coding counter 11 and controlled by the value of the above Ncoding counter 14.

By doing this, the PADAs of the data memory part 10 can be reduced from N to 1.

However, the conventional 12×12 STS-1 switch, is very difficult to use practically because the operation frequency is N times the data frequency.

SUMMARY OF THE INVENTION

Accordingly, a purpose of this invention is to reduce the RADAs of the data by using the 4-coding counter and to provide a 12×12 STS-1 switch whose capacity of the required memory is reduced to one third of the conventional switch.

Another purpose of this invention is to provide the 12×12 STS-1 switch appropriate for the hub structure and the digital switching system of the 155 Mbps synchronous transmission equipment by making the operation frequency 4 times.

The purpose and objectives of this invention are accomplished by 12×12 STS-1 switch including a 4-coding counter generating a data control signal and a carry out signal by counting the input signal in accordance with an operation frequency, a 90-coding counter generating the VT group and the VT channel by counting the frame pulse in accordance with the carry out signal generated at the 4-coding counter, an address generation means generating the switch information translation address and a data selection address in accordance with the VT group and the VT channel generated at the 90-coding counter, a data selection signal generation means outputting the data selection address generated at the address generation means in accordance with the selection signal outputted from the 4-coding counter after combining or selecting, and a data output means selecting and outputting the output data of the data memory in accordance with the data selection address outputted from the data selection signaling generation means.

DETAILED DESCRIPTION OF THE INVENTION

Figure 1:
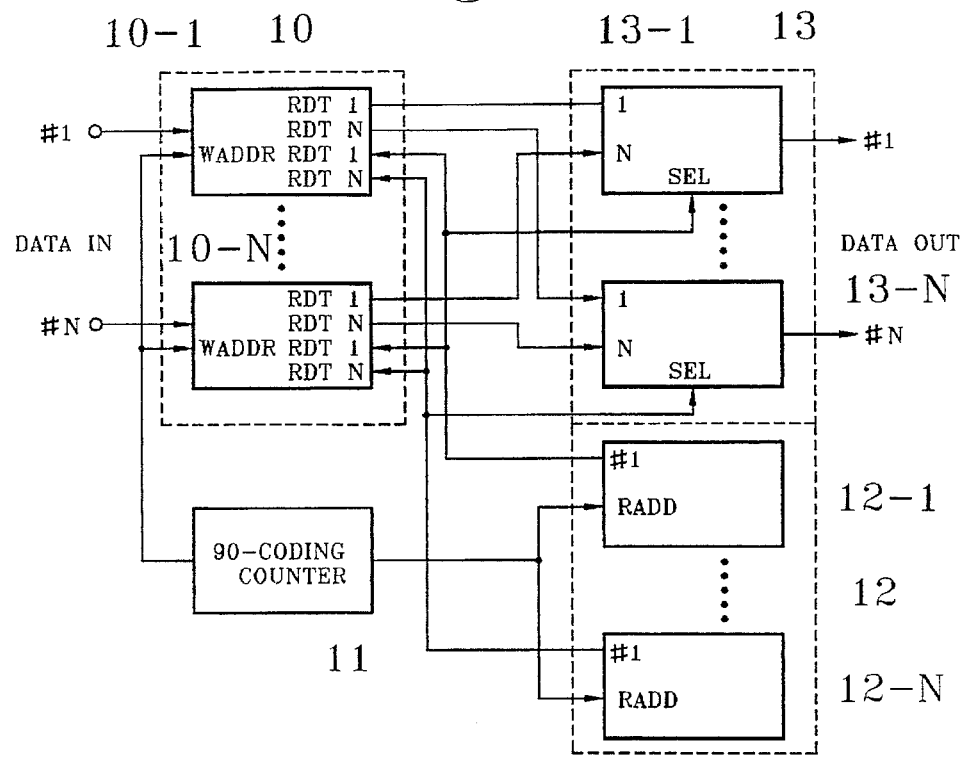
FIG. 1 is a block configuration diagram of the general 12×12 STS-1 switch.
Figure 2:
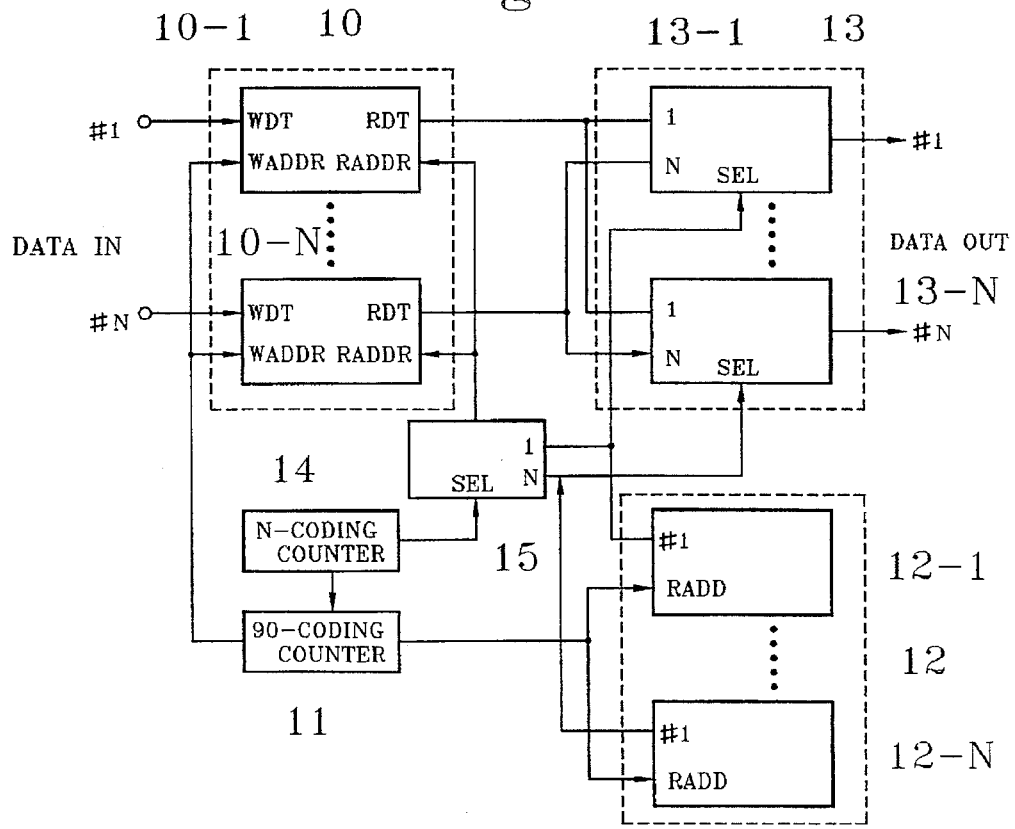
FIG. 2 is a block configuration diagram of the conventional 12×12 STS-1 switch.
Figure 3:
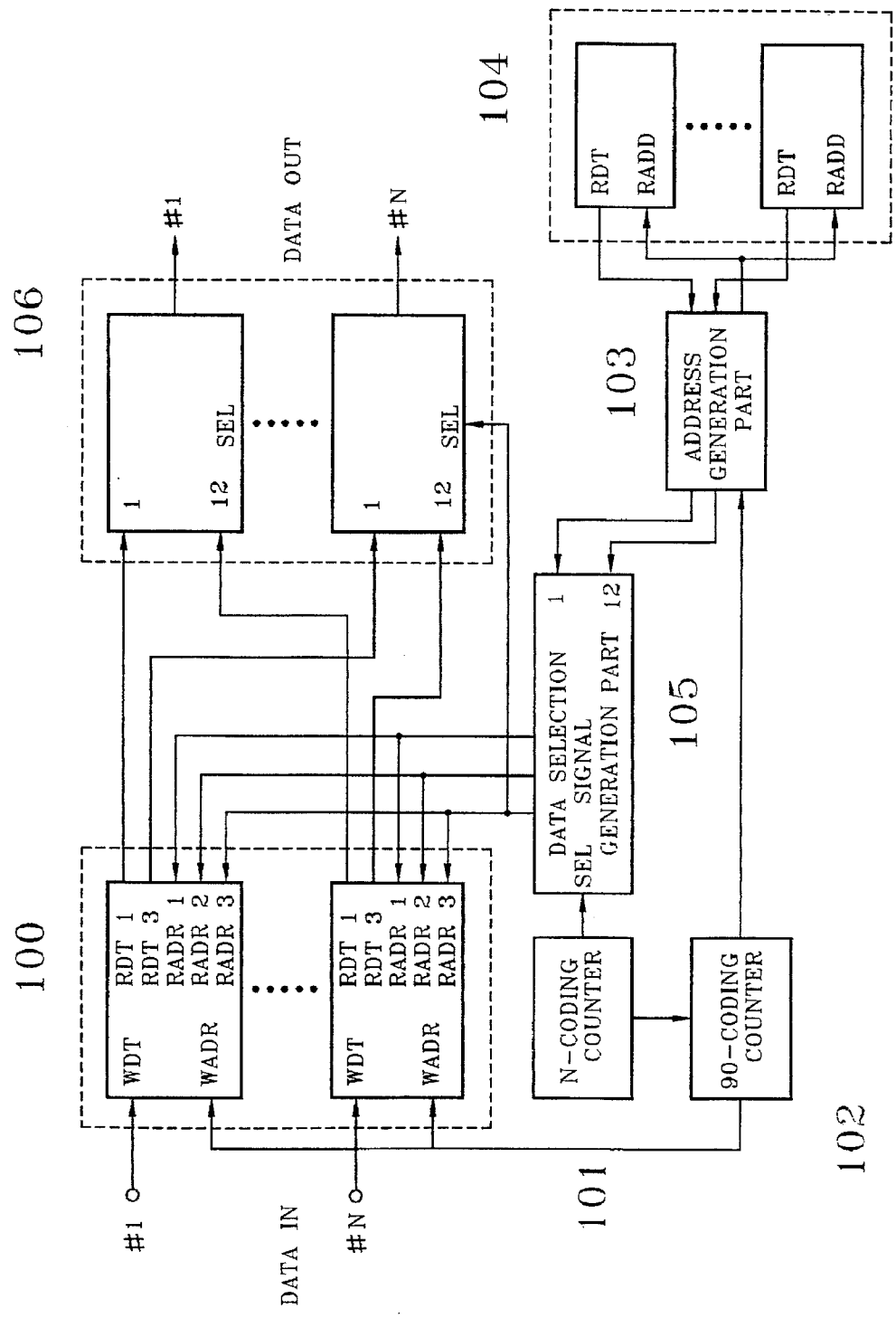
FIG. 3 is a block configuration diagram of the 12×12 STS-1 switch in accordance with the present invention.

FIG. 3 is a 12×12 STS-1 switch of the present invention, which comprises of a data memory part 100 storing the STS-1 data being inputted as illustrated below, a 4-coding counter 101 counting the frame pulse in 4-coded number and generating the data selection signal, a 90-coding counter 102 counting the above frame pulse in 90-coded number after being driven by the carry out signal generated at the above 4-coding counter 101, an address generation part 103 generating the switch information read address and the data selection address in accordance with the signal generated at the above 90-coding counter 102, a switch information memory part 104 where the switch information is stored, a data selection signal generation part 105 controlled in accordance with the signaling output from the above 4-coding counter 101 and generating the data selection signal in accordance with the data selection address generated at the above address generation part 103, and a data selection part 106 selecting and outputting the output data of the above data memory part 100 in accordance with the signal outputted from the above data selection signal generation part 105.

Figures 4, 5:
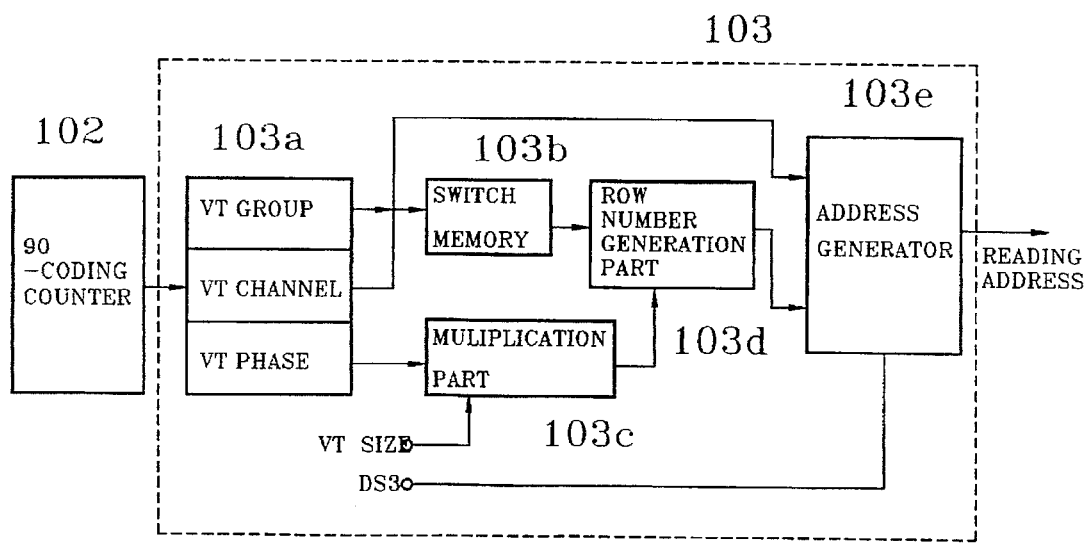
FIG. 4 is a drawing for describing the relation of the channel and the phase of the VT group applied to this invention.
FIG. 5 is a detailed configuration diagram of the address generation part of FIG. 3.

As shown in FIG. 5, the address generation part 103 is comprised of a VT channel and phase output part 103a outputting the channel and phase of the appropriate VT group in accordance with the signal output from the above 90-coding counter 102, a switch memory 103b outputting the channel value of the switch which will switch in accordance with the channel information outputted from the above VT channel and phase output part 103a, a multiplication part 103c outputting the result value after multiplying the phase value and the VT size value outputted from the above VT channel and phase output part 103a, a row number generation part 103d generating the row number after adding the output value of the above multiplication part 103c to the channel value output from the above switch memory 103b, and an address generator 103e generating the translation address in accordance with the DS3 multiplexing of the inputted STS-1 signal.

The detailed description of the operation and the effect of the 12×12 STS-1 switch of the present invention is provided below referring to the attached FIG. 4 and FIG. 5:

First, the 4-coding counter 101 has the data transmission speed of approximately (51.84 IMbps/8) *4-25.92 Mbps, which generates the data control signal and inputs the generated control signal into the data selection signal generation part 105, as well as generating the carry out signal and inputting it into the 90-coding counter 102.

Accordingly, the 90-coding counter 102 can generate the writing address by counting the input frame pulse and can record the input STS-1 data by inputting the generated writing address into the data memory part 100.

Here, the switching of the input signal commences after a certain period of time elapses, since the switching is possible even after the 32nd row of STS-1 is inputted, in case of the switching of VT1.5. That is, this is for preventing the data reading when the data is not written at the data memory part 100.

The above switching commences as the switch information memory part 104 reads the switch information, which is memorized per 32 units by making 9 bits one unit and whose configuration is as follows. That is, 1~2 bits represent the VT channel information, 3~5 bits the VT group information and 6~9 bits the STS-1 channel information.

The VT group has the value of 0~7, and the case that the value of the VT group is 0 is 'overhead' and 'fixed stuff'.

The switch information read from the above switch information memory part 104 is inputted into the data selection signal generation part 105, and the VT group and the VT channel are inputted into the address generation part 103 and converted into the reading address for the data memory part 100 after selecting 3 of N data input according to the control signal outputted from the above 4-coding counter 101.

And, the STS-1 channel information is inputted to the 4:1 selector in the data selection part 106 as the pontrol signal, and makes final STS-1 data switched as a VT signal unit outputted.

A more detailed description for converting the VT group and the VT channel information into the reading address of data memory part 100 is provided below.

The STS-1 signal is comprised of the seven VT groups, the overhead and the fixed stuff, and each VT group configured in 12 rows can accommodate four VT1.5, three VT2, two VT3 and one VT6.

In each VT group, the row where a specific row is located in the STS-1 signaling is always fixed.

Besides, because it is easy to recognize the row number located in the VT group as well, if there is any information regarding the configuration signal of the VT channel and the VT group, it is possible to recognize the row number in the STS-1 signal only if it is known whether the VT group, the VT channel and the configuration signal of the VT group is VT1.5, VT2, or VT6 at last.

Here, the relation of the channel and the phase in accordance with each signal configuration of the VT group ms described referring to FIG. 4.

As shown in FIG. 4, the phase represents which byte is in each configuration signal and the switching of the VT signal unit happens at the same phase only.

The row number in the VT group can be shown in the following equation (1).

$$\text{Row Number} = (\text{Phase} * \text{VT size}) + \text{Channel} \tag{1}$$

Where the VT size is a constant having the value of 4 in case of VT 1.5, 3 in case of VT 2, 2 in case of, VT 3, and 1 in case of VT6.

When the row number in the VT group is found out like this, the row number in the STS-1 signal can be hereby found out, which is inputted as the reading address of the data memory part loo.

In case DS3 is mapped in the STS-1 signal, the VT group and the VT channel generated from the 90-coding counter 102 are used directly without any necessity of calculation to find out the row number as described beforehand.

As described in detail above, the present invention uses the 90-coding counter output as the write and read address by dividing into the VT group and the VT channel rather than using it as the address directly. Therefore, from the viewpoint of the size of the required memory, as the data memory can be reduced to 64 bytes and the switch information memory can be reduced to 9 * 32 bits, it is easy to interconnect and manufacture and electric power consumption is sharply reduced.

Besides, as this invention requires 32 * 12 cycles while the conventional switch requires 90 * 12 cycles to load the switch information, the system of the present invention has faster transition time to arrive into the stable condition initially. In case of changing the switch information during the use of the system as well, there is effect to reduce the service interruption period accordingly.

What is claimed is:

1. A 12×12 STS-1 Switch characterized by the configuration comprising a 4-coding counter for generating a data control signal and a carry out signal by counting an input signal in accordance with an the operation frequency;

a 90-coding counter for generating a VT group and a VT channel by counting a frame pulse in accordance with said carry out signal generated at said 4-coding counter;

address generation means for generating a switch information read address and a data selection address in accordance with the VT group and said VT channel generated at said 90-coding counter;

data selection signal generation means for outputting said data selection address generated at said address generation means in accordance with a selection signal outputted from said 4-coding counter; and data output means for selecting and outputting an output data of a data memory in accordance with said data selection address outputted from said data selection signal generation means.

2. The switch in accordance with claim 1, wherein said 4-coding counter counts at a data transmission speed of approximately (51.840 Mbps/8)×4=25.92 Mbps.

3. The switch in accordance with claim 1, wherein said address generat on means comprises:

a VT channel and phase output part for outputting a channel and a phase of an appropriate VT group in accordance with said VT group and the VT channel output from said 90-coding Counter;

a switch memory for outputting a channel value of said switch which will be switching in accordance with a VT channel information outputted from said VT channel and said phase output part;

a multiplication part for outputting a result value after multiplying said phase value and said VT size value outputted from said VT channel and said phase output part;

a row number generation part for generating a row number by adding an output value of said multiplication part to said channel value output from said above switch memory; and an address generator for generating a read address in accordance with said row number generated at said row number generation part.

4. The switch in accordance with claim 3, wherein said address generator immediately generates the read address in accordance with a DS3 signal when DS3 is mapped in an STS-1 signal.

* * * * *